(12) United States Patent
Hahn-Carlson

(10) Patent No.: US 8,595,099 B2
(45) Date of Patent: Nov. 26, 2013

(54) FINANCIAL INSTITUTION-BASED TRANSACTION PROCESSING SYSTEM AND APPROACH

(75) Inventor: Dean W. Hahn-Carlson, Lilydale, MN (US)

(73) Assignee: Syncada LLC, Minneapolis, MN (US)

( * ) Notice: Subject to any disclaimer, the term of this patent is extended or adjusted under 35 U.S.C. 154(b) by 1177 days.

(21) Appl. No.: 12/492,965

(22) Filed: Jun. 26, 2009

(65) Prior Publication Data

US 2009/0307114 A1 Dec. 10, 2009

Related U.S. Application Data

(63) Continuation of application No. 11/151,747, filed on Jun. 9, 2005, which is a continuation-in-part of application No. 10/437,405, filed on May 12, 2003, now abandoned, which is a continuation-in-part of application No. 09/259,657, filed on Feb. 26, 1999, now Pat. No. 6,571,149, which is a continuation of application No. 08/748,243, filed on Nov. 12, 1996, now Pat. No. 5,910,896.

(60) Provisional application No. 60/379,561, filed on May 10, 2002, provisional application No. 60/578,375, filed on Jun. 9, 2004.

(51) Int. Cl.
 G06Q 40/00 (2012.01)
 G07F 19/00 (2006.01)

(52) U.S. Cl.
 USPC .................................. 705/35; 705/34; 705/40

(58) Field of Classification Search
 None
 See application file for complete search history.

(56) References Cited

U.S. PATENT DOCUMENTS

| | | |
|---|---|---|
| 4,114,027 A | 9/1978 | Slater et al. |
| 4,270,042 A | 5/1981 | Case |
| 4,305,059 A | 12/1981 | Benton |
| 4,412,287 A | 10/1983 | Braddock, III |
| 4,507,778 A | 3/1985 | Tan |
| 4,567,359 A | 1/1986 | Lockwood |
| 4,713,761 A | 12/1987 | Sharpe et al. |
| 4,725,719 A | 2/1988 | Oncken et al. |
| 4,750,119 A | 6/1988 | Cohen et al. |
| 4,799,156 A | 1/1989 | Shavit et al. |

(Continued)

FOREIGN PATENT DOCUMENTS

| | | |
|---|---|---|
| EP | 0339850 A2 | 2/1989 |
| EP | 0407026 A2 | 1/1991 |

(Continued)

OTHER PUBLICATIONS

McKeefry, "Seeking microcontrollers desperately," Electronic Buyers News, n972, Sep. 11, 1995, 6 pp.

(Continued)

*Primary Examiner* — Fahd Obeid
(74) *Attorney, Agent, or Firm* — Shumaker & Sieffert, P.A.

(57) ABSTRACT

Transaction processing for financial institution-based transactions is facilitated. According to an example embodiment of the present invention, a transaction processing approach involves the processing of financial aspects of a transaction between buying and selling parties using transaction rules associated with a sponsoring financial institution. Transaction-related information is processed as a function of business rules associated with the sponsoring financial institution to facilitate payment for the transaction and the assessment of fees associated with the transaction processing.

9 Claims, 3 Drawing Sheets

(56) References Cited

U.S. PATENT DOCUMENTS

| | | | |
|---|---|---|---|
| 4,926,325 A | 5/1990 | Benton et al. |
| 4,949,272 A | 8/1990 | Vanourek et al. |
| 4,960,981 A | 10/1990 | Benton et al. |
| 4,992,940 A | 2/1991 | Dworkin |
| 4,995,112 A | 2/1991 | Aoyama |
| 4,996,662 A | 2/1991 | Cooper et al. |
| 5,008,827 A | 4/1991 | Sansone et al. |
| 5,017,766 A | 5/1991 | Tamada et al. |
| 5,025,372 A | 6/1991 | Burton et al. |
| 5,040,132 A | 8/1991 | Schuricht et al. |
| 5,043,908 A | 8/1991 | Manduley et al. |
| 5,054,096 A | 10/1991 | Beizer |
| 5,077,694 A | 12/1991 | Sansone et al. |
| 5,117,364 A | 5/1992 | Barns-Slavin et al. |
| 5,151,948 A | 9/1992 | Lyke |
| 5,153,842 A | 10/1992 | Dlugos, Sr. et al. |
| 5,159,667 A | 10/1992 | Borrey et al. |
| 5,161,109 A | 11/1992 | Keating et al. |
| 5,168,444 A | 12/1992 | Cukor et al. |
| 5,175,416 A | 12/1992 | Mansvelt et al. |
| 5,208,446 A | 5/1993 | Martinez |
| 5,218,188 A | 6/1993 | Hanson |
| 5,220,501 A | 6/1993 | Lawlor et al. |
| 5,222,018 A | 6/1993 | Sharpe et al. |
| 5,231,569 A | 7/1993 | Myatt et al. |
| 5,238,349 A | 8/1993 | Grace, Sr. |
| 5,285,383 A | 2/1994 | Lingrey et al. |
| 5,293,310 A | 3/1994 | Carroll et al. |
| 5,329,589 A | 7/1994 | Fraser et al. |
| 5,334,823 A | 8/1994 | Noblett, Jr. et al. |
| 5,334,824 A | 8/1994 | Martinez |
| 5,337,246 A | 8/1994 | Carroll et al. |
| 5,357,563 A | 10/1994 | Hamilton et al. |
| 5,393,963 A | 2/1995 | Thomas et al. |
| 5,426,281 A | 6/1995 | Abecassis |
| 5,440,634 A | 8/1995 | Jones et al. |
| 5,483,445 A | 1/1996 | Pickering |
| 5,485,369 A | 1/1996 | Nicholls et al. |
| 5,500,513 A | 3/1996 | Langhans et al. |
| 5,631,821 A | 5/1997 | Muso |
| 5,631,827 A | 5/1997 | Nicholls et al. |
| 5,652,749 A | 7/1997 | Davenport et al. |
| 5,666,493 A | 9/1997 | Wojcik et al. |
| 5,671,362 A | 9/1997 | Cowe et al. |
| 5,677,955 A | 10/1997 | Doggett et al. |
| 5,694,334 A | 12/1997 | Donahue et al. |
| 5,694,551 A | 12/1997 | Doyle et al. |
| 5,699,528 A | 12/1997 | Hogan |
| 5,712,990 A | 1/1998 | Henderson |
| 5,717,989 A | 2/1998 | Tozzoli et al. |
| 5,719,771 A | 2/1998 | Buck et al. |
| 5,732,400 A | 3/1998 | Mandler |
| 5,754,854 A | 5/1998 | Kanamori et al. |
| 5,770,844 A | 6/1998 | Henn |
| 5,774,170 A | 6/1998 | Hite et al. |
| 5,790,790 A | 8/1998 | Smith et al. |
| 5,794,207 A | 8/1998 | Walker et al. |
| 5,799,286 A | 8/1998 | Morgan et al. |
| 5,806,063 A | 9/1998 | Dickens |
| 5,842,178 A | 11/1998 | Giovannoli |
| 5,845,283 A | 12/1998 | Williams |
| 5,870,719 A | 2/1999 | Maritzen et al. |
| 5,892,900 A | 4/1999 | Ginter et al. |
| 5,893,080 A | 4/1999 | McGurl et al. |
| 5,896,530 A | 4/1999 | White |
| 5,897,645 A | 4/1999 | Watters |
| 5,910,896 A | 6/1999 | Hahn-Carlson |
| 5,917,830 A | 6/1999 | Chen et al. |
| 5,918,216 A | 6/1999 | Miksovsky et al. |
| 5,918,229 A | 6/1999 | Davis et al. |
| 5,920,847 A | 7/1999 | Kolling et al. |
| 5,924,082 A | 7/1999 | Silverman et al. |
| 5,930,363 A | 7/1999 | Stanford et al. |
| 5,931,917 A | 8/1999 | Nguyen et al. |
| 5,943,670 A | 8/1999 | Prager et al. |
| 5,956,690 A | 9/1999 | Haggerson et al. |
| 5,956,700 A | 9/1999 | Landry |
| 5,960,407 A | 9/1999 | Vivona |
| 5,970,475 A | 10/1999 | Barnes et al. |
| 5,973,685 A | 10/1999 | Schaffa et al. |
| 5,978,567 A | 11/1999 | Rebane et al. |
| 5,982,891 A | 11/1999 | Ginter et al. |
| 5,987,506 A | 11/1999 | Carter et al. |
| 5,991,728 A | 11/1999 | Debusk et al. |
| 5,991,801 A | 11/1999 | Rebec et al. |
| 5,995,976 A | 11/1999 | Walker et al. |
| 6,012,041 A | 1/2000 | Brewer et al. |
| 6,016,477 A | 1/2000 | Ehnebuske et al. |
| 6,021,202 A | 2/2000 | Anderson et al. |
| 6,026,374 A | 2/2000 | Chess |
| 6,029,140 A | 2/2000 | Martin et al. |
| 6,029,150 A | 2/2000 | Kravitz |
| 6,043,819 A | 3/2000 | LeBrun et al. |
| 6,044,362 A | 3/2000 | Neely |
| 6,047,268 A | 4/2000 | Bartoli et al. |
| 6,055,519 A | 4/2000 | Kennedy et al. |
| 6,058,380 A | 5/2000 | Anderson et al. |
| 6,070,150 A | 5/2000 | Remington et al. |
| 6,085,200 A | 7/2000 | Hill et al. |
| 6,097,834 A | 8/2000 | Krouse et al. |
| 6,115,649 A | 9/2000 | Sakata |
| 6,115,711 A | 9/2000 | White |
| 6,119,163 A | 9/2000 | Montiero et al. |
| 6,128,602 A | 10/2000 | Northington et al. |
| 6,131,087 A | 10/2000 | Luke et al. |
| 6,141,653 A | 10/2000 | Conklin et al. |
| 6,151,588 A | 11/2000 | Frederick et al. |
| 6,157,924 A | 12/2000 | Austin |
| 6,167,378 A | 12/2000 | Webber, Jr. |
| 6,169,542 B1 | 1/2001 | Hooks et al. |
| 6,199,046 B1 | 3/2001 | Heinzle et al. |
| 6,204,763 B1 | 3/2001 | Sone |
| 6,209,095 B1 | 3/2001 | Anderson et al. |
| 6,223,168 B1 | 4/2001 | McGurl et al. |
| 6,236,972 B1 | 5/2001 | Shkedy |
| 6,246,994 B1 | 6/2001 | Wolven et al. |
| 6,254,000 B1 | 7/2001 | Degen et al. |
| 6,260,024 B1 | 7/2001 | Shkedy |
| 6,266,640 B1 | 7/2001 | Fromm et al. |
| 6,267,292 B1 | 7/2001 | Walker et al. |
| 6,275,813 B1 | 8/2001 | Berka |
| 6,285,916 B1 | 9/2001 | Kadaba et al. |
| 6,317,737 B1 | 11/2001 | Gorelik et al. |
| 6,323,894 B1 | 11/2001 | Katz et al. |
| 6,324,522 B2 | 11/2001 | Peterson et al. |
| 6,324,551 B1 | 11/2001 | Lamping et al. |
| 6,330,550 B1 | 12/2001 | Brisebois et al. |
| 6,338,044 B1 | 1/2002 | Cook et al. |
| 6,357,042 B2 | 3/2002 | Srinivasan et al. |
| 6,366,829 B1 | 4/2002 | Wallace |
| 6,381,587 B1 | 4/2002 | Guzelsu |
| 6,389,402 B1 | 5/2002 | Ginter et al. |
| 6,418,441 B1 | 7/2002 | Call |
| 6,421,691 B1 | 7/2002 | Kajitani |
| 6,442,533 B1 | 8/2002 | Hinkle |
| 6,477,510 B1 | 11/2002 | Johnson |
| 6,486,899 B1 | 11/2002 | Bush et al. |
| 6,490,567 B1 | 12/2002 | Gregory |
| 6,493,685 B1 | 12/2002 | Ensel et al. |
| 6,499,036 B1 | 12/2002 | Gurevich |
| 6,505,169 B1 | 1/2003 | Bhagavath et al. |
| 6,505,172 B1 | 1/2003 | Johnson et al. |
| 6,507,826 B1 | 1/2003 | Maners |
| 6,510,383 B1 | 1/2003 | Jones |
| 6,510,384 B2 | 1/2003 | Okano |
| 6,526,443 B1 | 2/2003 | Goldsmith et al. |
| 6,539,360 B1 | 3/2003 | Kadaba |
| 6,571,149 B1 | 5/2003 | Hahn-Carlson |
| 6,598,026 B1 | 7/2003 | Ojha et al. |
| 6,607,081 B2 | 8/2003 | Graef et al. |
| 6,629,081 B1 | 9/2003 | Cornelius et al. |
| 6,673,479 B2 | 1/2004 | McArthur et al. |
| 6,684,384 B1 | 1/2004 | Bickerton et al. |
| 6,687,713 B2 | 2/2004 | Mattson et al. |

(56) References Cited

U.S. PATENT DOCUMENTS

| | | |
|---|---|---|
| 6,697,702 B1 | 2/2004 | Hahn-Carlson |
| 6,704,612 B1 | 3/2004 | Hahn-Carlson |
| 6,721,613 B1 | 4/2004 | Yamamoto et al. |
| 6,721,715 B2 | 4/2004 | Nemzow |
| 6,741,968 B2 | 5/2004 | Jacoves et al. |
| 6,751,630 B1 | 6/2004 | Franks et al. |
| 6,785,661 B1 | 8/2004 | Mandler et al. |
| 6,789,252 B1 | 9/2004 | Burke et al. |
| 6,792,459 B2 | 9/2004 | Elnozahy et al. |
| 6,820,038 B1 | 11/2004 | Wetzer et al. |
| 6,829,590 B1 | 12/2004 | Greener et al. |
| 6,832,212 B1 | 12/2004 | Zenner et al. |
| 6,833,865 B1 | 12/2004 | Fuller et al. |
| 6,850,900 B1 | 2/2005 | Hare et al. |
| 6,873,963 B1 | 3/2005 | Westbury et al. |
| 6,873,997 B1 | 3/2005 | Majjasie et al. |
| 6,879,962 B1 | 4/2005 | Smith et al. |
| 6,882,983 B2 | 4/2005 | Furphy et al. |
| 6,882,986 B1 | 4/2005 | Heinemann et al. |
| 6,889,194 B1 | 5/2005 | Kadaba |
| 6,895,438 B1 | 5/2005 | Ulrich |
| 6,915,268 B2 | 7/2005 | Riggs et al. |
| 6,937,992 B1 | 8/2005 | Benda et al. |
| 6,941,281 B1 | 9/2005 | Johnson |
| 6,944,595 B1 | 9/2005 | Graser et al. |
| 6,973,258 B1 | 12/2005 | Yoo et al. |
| 6,983,278 B1 | 1/2006 | Yu et al. |
| 6,988,111 B2 | 1/2006 | Chow et al. |
| 6,999,943 B1 | 2/2006 | Johnson et al. |
| 7,047,210 B1 | 5/2006 | Srinivasan |
| 7,054,841 B1 | 5/2006 | Tenorio |
| 7,069,234 B1 | 6/2006 | Cornelius et al. |
| 7,069,248 B2 | 6/2006 | Huber |
| 7,076,652 B2 | 7/2006 | Ginter et al. |
| 7,079,176 B1 | 7/2006 | Freeman et al. |
| 7,099,304 B2 | 8/2006 | Liu et al. |
| 7,110,959 B2 | 9/2006 | Hahn-Carlson |
| 7,110,979 B2 | 9/2006 | Tree |
| 7,113,964 B1 | 9/2006 | Bequet et al. |
| 7,117,170 B1 | 10/2006 | Bennett et al. |
| 7,120,871 B1 | 10/2006 | Harrington |
| 7,124,150 B2 | 10/2006 | Majjasie et al. |
| 7,130,822 B1 | 10/2006 | Their et al. |
| 7,131,069 B1 | 10/2006 | Rush et al. |
| 7,133,835 B1 | 11/2006 | Fusz et al. |
| 7,136,467 B2 | 11/2006 | Brockman et al. |
| 7,143,058 B2 | 11/2006 | Sugimoto et al. |
| 7,146,337 B1 | 12/2006 | Ward et al. |
| 7,149,744 B1 | 12/2006 | Tenorio |
| 7,162,458 B1 | 1/2007 | Flangan et al. |
| 7,177,836 B1 | 2/2007 | German et al. |
| 7,181,017 B1 | 2/2007 | Nagel et al. |
| 7,203,662 B2 | 4/2007 | Das et al. |
| 7,206,768 B1 | 4/2007 | DeGroeve et al. |
| 7,222,081 B1 | 5/2007 | Sone |
| 7,243,139 B2 | 7/2007 | Ullman et al. |
| 7,254,588 B2 | 8/2007 | Sung et al. |
| 7,257,560 B2 | 8/2007 | Jacobs et al. |
| 7,263,506 B2 | 8/2007 | Lee et al. |
| 7,324,976 B2 | 1/2008 | Gupta et al. |
| 7,327,952 B2 | 2/2008 | Enomoto |
| 7,340,433 B1 | 3/2008 | Kay et al. |
| 7,346,575 B1 | 3/2008 | Ahles et al. |
| 7,363,261 B2 | 4/2008 | Whitehead et al. |
| 7,366,684 B1 | 4/2008 | Douglas |
| 7,373,365 B2 | 5/2008 | Varadarajan et al. |
| 7,386,502 B1 | 6/2008 | Butcher, III |
| 7,392,934 B2 | 7/2008 | Hahn-Carlson et al. |
| 7,415,471 B1 | 8/2008 | Coleman |
| 7,415,617 B2 | 8/2008 | Ginter et al. |
| 7,433,845 B1 | 10/2008 | Flitcroft et al. |
| 7,437,310 B1 | 10/2008 | Dutta |
| 7,448,063 B2 | 11/2008 | Freeman et al. |
| 7,475,024 B1 | 1/2009 | Phan |
| 7,496,519 B2 | 2/2009 | Hahn-Carlson et al. |
| 7,499,875 B1 | 3/2009 | May et al. |
| 7,529,706 B2 | 5/2009 | Kulasooriya et al. |
| 7,536,354 B1 | 5/2009 | DeGroeve et al. |
| 7,536,362 B2 | 5/2009 | Starr et al. |
| 7,548,884 B1 | 6/2009 | Thomas |
| 7,558,793 B1 | 7/2009 | Topolovac et al. |
| 7,574,363 B2 | 8/2009 | Bodin |
| 7,574,386 B2 | 8/2009 | Hahn-Carlson et al. |
| 7,587,363 B2 | 9/2009 | Cataline et al. |
| 7,590,575 B2 | 9/2009 | Yu et al. |
| 7,617,146 B2 | 11/2009 | Keaton et al. |
| 7,627,499 B2 | 12/2009 | Hahn-Carlson |
| 7,634,455 B1 | 12/2009 | Keene et al. |
| 7,640,195 B2 | 12/2009 | Von Zimmerman et al. |
| 7,660,788 B1 | 2/2010 | Clark |
| 7,693,791 B2 | 4/2010 | Hahn-Carlson et al. |
| 7,702,563 B2 | 4/2010 | Balson et al. |
| 7,725,372 B2 | 5/2010 | Hahn-Carlson |
| 7,765,136 B2 | 7/2010 | Northington et al. |
| 7,822,653 B2 | 10/2010 | Hahn-Carlson et al. |
| 7,890,395 B2 | 2/2011 | Phelan |
| 7,925,551 B2 | 4/2011 | Hahn-Carlson et al. |
| 7,970,671 B2 | 6/2011 | Hahn-Carlson et al. |
| 8,050,938 B1 | 11/2011 | Green et al. |
| 8,060,410 B2 | 11/2011 | Hahn-Carlson |
| 8,069,054 B2 | 11/2011 | Hahn-Carlson et al. |
| 8,103,575 B1 | 1/2012 | Hinkle |
| 8,126,785 B2 | 2/2012 | Hahn-Carlson et al. |
| 2001/0009002 A1 | 7/2001 | Logan et al. |
| 2001/0011241 A1 | 8/2001 | Nemzow |
| 2001/0014878 A1 | 8/2001 | Mitra |
| 2001/0025262 A1 | 9/2001 | Ahmed |
| 2001/0032154 A1 | 10/2001 | Schlummer |
| 2001/0032171 A1 | 10/2001 | Brink et al. |
| 2001/0032183 A1 | 10/2001 | Landry |
| 2001/0039522 A1 | 11/2001 | Saxon |
| 2001/0047311 A1 | 11/2001 | Singh |
| 2001/0056395 A1 | 12/2001 | Khan |
| 2002/0007302 A1 | 1/2002 | Work et al. |
| 2002/0016765 A1 | 2/2002 | Sacks et al. |
| 2002/0026374 A1 | 2/2002 | Moneymaker et al. |
| 2002/0032649 A1 | 3/2002 | Selvarajan |
| 2002/0035488 A1 | 3/2002 | Aquila et al. |
| 2002/0038277 A1 | 3/2002 | Yuan |
| 2002/0038305 A1 | 3/2002 | Bahl et al. |
| 2002/0040304 A1 | 4/2002 | Shenoy et al. |
| 2002/0042782 A1 | 4/2002 | Albazz et al. |
| 2002/0046081 A1 | 4/2002 | Albazz et al. |
| 2002/0046125 A1 | 4/2002 | Speicher et al. |
| 2002/0046147 A1 | 4/2002 | Livesay et al. |
| 2002/0046169 A1 | 4/2002 | Keresman et al. |
| 2002/0048369 A1 | 4/2002 | Ginter et al. |
| 2002/0049622 A1 | 4/2002 | Lettich et al. |
| 2002/0055850 A1 | 5/2002 | Powell et al. |
| 2002/0059122 A1 | 5/2002 | Inoue et al. |
| 2002/0059134 A1 | 5/2002 | Ebbs et al. |
| 2002/0062278 A1 | 5/2002 | Ingram et al. |
| 2002/0065736 A1 | 5/2002 | Willner et al. |
| 2002/0065738 A1 | 5/2002 | Riggs et al. |
| 2002/0069177 A1 | 6/2002 | Carrott et al. |
| 2002/0072956 A1 | 6/2002 | Willems et al. |
| 2002/0077978 A1 | 6/2002 | O'Leary et al. |
| 2002/0087344 A1 | 7/2002 | Billings et al. |
| 2002/0087455 A1 | 7/2002 | Tsagarakis |
| 2002/0095355 A1 | 7/2002 | Walker et al. |
| 2002/0103661 A1 | 8/2002 | Albazz et al. |
| 2002/0107761 A1 | 8/2002 | Kark et al. |
| 2002/0107794 A1 | 8/2002 | Furphy et al. |
| 2002/0111886 A1 | 8/2002 | Chenevich et al. |
| 2002/0116288 A1 | 8/2002 | Nakajima |
| 2002/0116334 A1 | 8/2002 | Bennett et al. |
| 2002/0116348 A1 | 8/2002 | Phillips et al. |
| 2002/0120570 A1 | 8/2002 | Loy |
| 2002/0123919 A1 | 9/2002 | Brockman et al. |
| 2002/0123973 A1 | 9/2002 | Eccles et al. |
| 2002/0143858 A1 | 10/2002 | Teague et al. |
| 2002/0147655 A1 | 10/2002 | Say |
| 2002/0156797 A1 | 10/2002 | Lee et al. |
| 2002/0161719 A1 | 10/2002 | Manning et al. |

(56) References Cited

U.S. PATENT DOCUMENTS

| | | |
|---|---|---|
| 2002/0174034 A1 | 11/2002 | Au et al. |
| 2002/0184527 A1 | 12/2002 | Chun et al. |
| 2002/0194174 A1 | 12/2002 | Calkins et al. |
| 2002/0198829 A1 | 12/2002 | Ludwig et al. |
| 2002/0198833 A1 | 12/2002 | Wohlstadter |
| 2003/0004823 A1 | 1/2003 | Sagy |
| 2003/0005876 A1 | 1/2003 | Boswell |
| 2003/0014325 A1 | 1/2003 | Biffar et al. |
| 2003/0018563 A1 | 1/2003 | Kilgour et al. |
| 2003/0026404 A1 | 2/2003 | Joyce et al. |
| 2003/0033205 A1 | 2/2003 | Nowers et al. |
| 2003/0033240 A1 | 2/2003 | Balson et al. |
| 2003/0041008 A1 | 2/2003 | Grey et al. |
| 2003/0046089 A1 | 3/2003 | Menniger et al. |
| 2003/0050876 A1 | 3/2003 | Tawara et al. |
| 2003/0055675 A1 | 3/2003 | Klein Twennaar |
| 2003/0055779 A1 | 3/2003 | Wolf |
| 2003/0055783 A1 | 3/2003 | Cataline et al. |
| 2003/0074206 A1 | 4/2003 | Hoffman et al. |
| 2003/0074298 A1 | 4/2003 | Duam |
| 2003/0093320 A1 | 5/2003 | Sullivan |
| 2003/0097318 A1 | 5/2003 | Yu et al. |
| 2003/0115129 A1 | 6/2003 | Feaver |
| 2003/0117446 A1 | 6/2003 | Esposito-Ross et al. |
| 2003/0126047 A1 | 7/2003 | Hollar et al. |
| 2003/0135425 A1 | 7/2003 | Leavitt |
| 2003/0135435 A1 | 7/2003 | Aharoni |
| 2003/0139985 A1 | 7/2003 | Hollar et al. |
| 2003/0144901 A1 | 7/2003 | Coultier et al. |
| 2003/0149674 A1 | 8/2003 | Good et al. |
| 2003/0154163 A1 | 8/2003 | Phillips et al. |
| 2003/0158811 A1 | 8/2003 | Sanders et al. |
| 2003/0163431 A1 | 8/2003 | Ginter et al. |
| 2003/0187796 A1 | 10/2003 | Swift et al. |
| 2003/0191711 A1 | 10/2003 | Jamison et al. |
| 2003/0195815 A1 | 10/2003 | Li et al. |
| 2003/0200172 A1 | 10/2003 | Randle |
| 2003/0200185 A1 | 10/2003 | Huerta et al. |
| 2003/0212617 A1 | 11/2003 | Stone et al. |
| 2003/0220863 A1 | 11/2003 | Holm et al. |
| 2003/0225883 A1 | 12/2003 | Greaves et al. |
| 2003/0233252 A1 | 12/2003 | Haskell et al. |
| 2003/0233286 A1 | 12/2003 | Hahn-Carlson et al. |
| 2003/0233292 A1 | 12/2003 | Richey et al. |
| 2003/0233321 A1 | 12/2003 | Scolini et al. |
| 2004/0010463 A1 | 1/2004 | Hahn-Carlson |
| 2004/0019562 A1 | 1/2004 | Viberg |
| 2004/0034578 A1 | 2/2004 | Oney et al. |
| 2004/0039696 A1 | 2/2004 | Harmon et al. |
| 2004/0049446 A1 | 3/2004 | Seljeseth |
| 2004/0068431 A1 | 4/2004 | Smith et al. |
| 2004/0095237 A1 | 5/2004 | Chen et al. |
| 2004/0098350 A1 | 5/2004 | Labrou et al. |
| 2004/0098663 A1 | 5/2004 | Rey et al. |
| 2004/0107123 A1 | 6/2004 | Haffner et al. |
| 2004/0107125 A1 | 6/2004 | Guheen et al. |
| 2004/0117383 A1 | 6/2004 | Lee et al. |
| 2004/0123129 A1 | 6/2004 | Ginter et al. |
| 2004/0139032 A1 | 7/2004 | Rowan |
| 2004/0153389 A1 | 8/2004 | Lortscher |
| 2004/0153403 A1 | 8/2004 | Sadre |
| 2004/0153407 A1 | 8/2004 | Club et al. |
| 2004/0158510 A1 | 8/2004 | Fisher |
| 2004/0172360 A1 | 9/2004 | Mabrey et al. |
| 2004/0172368 A1 | 9/2004 | Johnson et al. |
| 2004/0181468 A1 | 9/2004 | Harmon et al. |
| 2004/0184163 A1 | 9/2004 | Nishioka et al. |
| 2004/0186806 A1 | 9/2004 | Sinclair et al. |
| 2004/0187075 A1 | 9/2004 | Maxham et al. |
| 2004/0201074 A1 | 10/2004 | Khandros et al. |
| 2004/0225574 A1 | 11/2004 | Arnold et al. |
| 2004/0230536 A1 | 11/2004 | Fung et al. |
| 2004/0230601 A1 | 11/2004 | Joao et al. |
| 2004/0243690 A1 | 12/2004 | Hancock et al. |
| 2004/0254808 A1 | 12/2004 | Bennett et al. |
| 2004/0260634 A1 | 12/2004 | King et al. |
| 2005/0015332 A1 | 1/2005 | Chen |
| 2005/0021363 A1 | 1/2005 | Stimson et al. |
| 2005/0021527 A1 | 1/2005 | Zhang et al. |
| 2005/0027613 A1 | 2/2005 | Takekuma et al. |
| 2005/0027651 A1 | 2/2005 | DeVault et al. |
| 2005/0033660 A1 | 2/2005 | Solomon |
| 2005/0033760 A1 | 2/2005 | Fuller et al. |
| 2005/0055306 A1 | 3/2005 | Miller et al. |
| 2005/0075964 A1 | 4/2005 | Quinn et al. |
| 2005/0119980 A1 | 6/2005 | Kohavi et al. |
| 2005/0125260 A1 | 6/2005 | Green et al. |
| 2005/0131839 A1 | 6/2005 | Cordery et al. |
| 2005/0137947 A1 | 6/2005 | Schaub et al. |
| 2005/0149378 A1 | 7/2005 | Cyr et al. |
| 2005/0165699 A1 | 7/2005 | Hahn-Carlson |
| 2005/0177435 A1 | 8/2005 | Lidow |
| 2005/0177507 A1 | 8/2005 | Bandych et al. |
| 2005/0192896 A1 | 9/2005 | Hutchinson et al. |
| 2005/0216368 A1 | 9/2005 | Wechsel |
| 2005/0234820 A1 | 10/2005 | MacKouse |
| 2005/0240592 A1 | 10/2005 | Mamou et al. |
| 2005/0246192 A1 | 11/2005 | Jauffred et al. |
| 2005/0251478 A1 | 11/2005 | Yanavi |
| 2005/0256802 A1 | 11/2005 | Ammermann et al. |
| 2005/0274792 A1 | 12/2005 | Hahn-Carlson et al. |
| 2005/0278220 A1 | 12/2005 | Hahn-Carlson et al. |
| 2005/0278221 A1 | 12/2005 | Hahn-Carlson et al. |
| 2005/0278244 A1 | 12/2005 | Yuan |
| 2005/0278251 A1 | 12/2005 | Hahn-Carlson |
| 2005/0278255 A1 | 12/2005 | Hahn-Carlson et al. |
| 2005/0283434 A1 | 12/2005 | Hahn-Carlson et al. |
| 2005/0283437 A1 | 12/2005 | McRae et al. |
| 2005/0289023 A1 | 12/2005 | Hahn-Carlson et al. |
| 2005/0289024 A1 | 12/2005 | Hahn-Carlson |
| 2006/0004670 A1* | 1/2006 | McKenney et al. ............ 705/64 |
| 2006/0010058 A1 | 1/2006 | D'Hers et al. |
| 2006/0015454 A1 | 1/2006 | Hahn-Carlson |
| 2006/0036476 A1 | 2/2006 | Klem |
| 2006/0116957 A1 | 6/2006 | May et al. |
| 2006/0167762 A1 | 7/2006 | Hahn-Carlson |
| 2006/0167791 A1 | 7/2006 | Hahn-Carlson |
| 2006/0167792 A1 | 7/2006 | Hahn-Carlson |
| 2006/0233334 A1 | 10/2006 | Bingaman et al. |
| 2006/0287953 A1 | 12/2006 | Chauhan |
| 2007/0022021 A1 | 1/2007 | Walker et al. |
| 2007/0055582 A1 | 3/2007 | Hahn-Carlson |
| 2007/0136278 A1 | 6/2007 | Grazioli et al. |
| 2007/0156584 A1 | 7/2007 | Barnes et al. |
| 2007/0192178 A1 | 8/2007 | Fung et al. |
| 2007/0208635 A1 | 9/2007 | Van Luchene et al. |
| 2007/0214065 A1 | 9/2007 | Kahlon et al. |
| 2007/0214077 A1 | 9/2007 | Barnes et al. |
| 2007/0246528 A1 | 10/2007 | Kubo et al. |
| 2007/0262140 A1 | 11/2007 | Long |
| 2007/0271160 A1 | 11/2007 | Stone et al. |
| 2007/0282724 A1 | 12/2007 | Barnes et al. |
| 2007/0282744 A1 | 12/2007 | Barnes et al. |
| 2007/0299091 A1* | 12/2007 | Fowler et al. ................. 705/38 |
| 2008/0082374 A1 | 4/2008 | Kennis et al. |
| 2008/0086396 A1 | 4/2008 | Hahn-Carlson |
| 2008/0103972 A1 | 5/2008 | Lanc |
| 2008/0172314 A1 | 7/2008 | Hahn-Carlson |
| 2008/0215456 A1 | 9/2008 | West et al. |
| 2008/0249940 A1 | 10/2008 | Hahn-Carlson et al. |
| 2009/0171727 A1 | 7/2009 | Hahn-Carlson |
| 2009/0192922 A1 | 7/2009 | Hahn-Carlson |
| 2009/0259576 A1 | 10/2009 | Hahn-Carlson |
| 2009/0265274 A1 | 10/2009 | Hahn-Carlson et al. |
| 2009/0287590 A1 | 11/2009 | Hahn-Carlson |
| 2009/0287598 A1 | 11/2009 | Hahn-Carlson |
| 2009/0292630 A1 | 11/2009 | Hahn-Carlson et al. |
| 2010/0017315 A1 | 1/2010 | Hahn-Carlson |
| 2010/0049650 A1 | 2/2010 | Keaton et al. |
| 2010/0070397 A1 | 3/2010 | Hahn-Carlson et al. |
| 2010/0138325 A1 | 6/2010 | Hahn-Carlson |
| 2010/0185540 A1 | 7/2010 | Hahn-Carlson et al. |
| 2010/0205054 A1 | 8/2010 | Hahn-Carlson et al. |

(56) References Cited

U.S. PATENT DOCUMENTS

| | | | |
|---|---|---|---|
| 2011/0004544 | A1 | 1/2011 | Baum |
| 2011/0029404 | A1 | 2/2011 | Hahn-Carlson et al. |
| 2012/0158558 | A1 | 6/2012 | Hahn-Carlson et al. |

FOREIGN PATENT DOCUMENTS

| | | | |
|---|---|---|---|
| EP | 0425421 | A2 | 5/1991 |
| EP | 0779587 | A2 | 6/1997 |
| EP | 1659526 | A2 | 5/2006 |
| FR | 2543327 | A1 | 9/1984 |
| GB | 2398894 | | 9/2004 |
| GB | 2398894 | A | 9/2004 |
| JP | 2001312680 | A | 11/2001 |
| WO | WO 97/07468 | A1 | 2/1997 |
| WO | WO 99/08218 | A1 | 2/1999 |
| WO | WO 00/62225 | A1 | 10/2000 |
| WO | WO 01/09782 | A2 | 2/2001 |
| WO | WO 01/35570 | A1 | 5/2001 |
| WO | WO 01/48659 | A1 | 7/2001 |
| WO | WO 01/82193 | A1 | 11/2001 |
| WO | WO 01/88813 | A1 | 11/2001 |
| WO | WO 0182193 | | 11/2001 |
| WO | WO 0188813 | | 11/2001 |
| WO | WO 01/26017 | A2 | 12/2001 |
| WO | WO 02/21405 | A1 | 3/2002 |
| WO | WO 02/006920 | A2 | 9/2002 |
| WO | WO 2005/124635 | A2 | 12/2005 |
| WO | WO 2006/071881 | A2 | 7/2006 |
| WO | WO 2008/045793 | A1 | 4/2008 |

OTHER PUBLICATIONS

Mallory, Great Plains Accounting v.7 (Great Plains Software's accounting software) (Product Accouncement), Apr. 22, 1993, 3 pp.

Russell, "Kitting out is now in (Use of component kits is expanding as distributors develop added-value activities)," Electronic Times (online), n 852, Apr. 17, 1997, 4 pp.

Spencer et al., "JIT Systems and external logistices suppliers," International Journal of Operations & Production Management, v14, n6, pp. 60-74, 1994.

White, How Computers Work, Sep. 1999, 93 pp.

Professional Builder (1993) www.highbeam.com, Contracts & Law: Part III 8 pp.

South China Morning Post, Hong Kong, Buying "Products over the Net," Jul. 2000, 2 pp.

Xcitek Press Release, "U.S. Bank Selects Xcitek for Corporate Actions Data and XSP for Corporate Actions Automation," NY, NY, Dec. 2003, 1 pp.

Berhad, "Fueling financial oil for the economy," The New Straits Times Press (Malaysia), Dec. 10, 2001, 3 pp.

Singh, "A new road to recovery," Risk, pp. 108-110, Sep. 2004.

"Credit Derivatives and Mortgage-backed Bonds in Capital Adequacy Requirements for Market Risk," http://www.rahoitustarkastus.fi/Eng/Regulation/FSA_standards/FSA_interpretations/4_2005.html, Apr. 2005, 5 pp.

Brochure: SAP Supplier Relationship Management—At a Glance, SAP, 2003, 16 pp.

Brochure: Self-Service Procurement: Slashing Costs and Saving Time, SAP, 2003, 12 pp.

Electronic Commerce News, "Sarbanes-Oxley Continue to be Key Issue in Corporate Payments Space," Sep. 1, 2003, v8, issue 18, 7 pp.

Fletcher, "Limits on reinsurance offsets sought by California regulator," Business Insurance, May 8, 1995 4 pp.

Denver Business Wire, "JD Edwards Continues to drive network-centric applications delivery with OneWorld enhancements," Jun. 16, 1997, p. 06160089.

Notice from the European Patent Office concerning business methods, dated Oct. 1, 2007, 2 pp.

Egan, "Administrative Orders from the Office of the Governor of Alaska," Jul. 18, 1972, 3 pp. http://www.gov.state.ak.us/admin-orders/018.html.

Bodnar, "Estimating Exchange Rate Exposure: Issues in Model Structure," Financial Management v32, n1, pp. 35-67, 2003.

Plewka, "Germany seizes the Emu initiative," International Tax Review, v8, n5, pp. 43-46, May 1997.

Huang, "Exchange Risk and Exchange Rate Pass-Through," v67/02-A of Dissertation Abstracts International, 2005.

\* cited by examiner

FINANCIAL INSTITUTION-BASED TRANSACTION PROCESSING SYSTEM AND APPROACH

RELATED PATENT DOCUMENTS

This patent document a continuation under 35 U.S.C. §120 of U.S. patent application Ser. No. 11/151,747 filed on Jun. 9, 2005 and entitled "Financial Institution-Based Transaction Processing System and Approach," which claims benefit under 35 U.S.C. §119 of U.S. Provisional Patent Application Ser. No. 60/578,375 filed on Jun. 9, 2004; U.S. patent application Ser. No. 11/151,747 is also a continuation-in-part of U.S. patent application Ser. No. 10/437,405 filed on May 12, 2003 now abandoned; U.S. patent application Ser. No. 10/437,405 is further a continuation-in-part of U.S. patent application Ser. No. 09/259,657 filed on Feb. 26, 1999 (U.S. Pat. No. 6,571,149), which is a continuation of U.S. patent application Ser. No. 08/748,243 filed on Nov. 12, 1996 (U.S. Pat. No. 5,910,896); U.S. patent application Ser. No. 10/437,405 further claims benefit of U.S. Provisional Patent Application Ser. No. 60/379,561 filed on May 10, 2002.

FIELD OF THE INVENTION

The present invention is directed to communications and data processing and, more specifically, to communications and data processing involving transaction-related financial processing.

BACKGROUND

Operational management of contractual and transactional interactions between buyers, sellers, financial institutions and others involved in the exchange of products for purposes of commerce have typically been labor and time intensive. Generally, the processes of managing transactions between business entities have been unduly burdensome and inefficient.

Financial institutions employ transaction processing parameters that are unique to each institution. In addition, these transaction processing parameters typically need to be kept separate (and confidential), relative to other financial institutions. Often, transaction processing is dependent upon these parameters, which are specific to a particular financial institution involved in financing the transaction. In this regard, transaction processing for portions of a transaction that are related to a financial institution has generally been limited to implementation by a processing engine or system employed by the financial institution participating in the transaction.

When a transaction reaches the payment step, financial institutions for different parties to the transaction must interact with each other. This interaction typically involves complex agreements and associations that facilitate the transfer of funds. At times, there can be delays in payment or disputes regarding terms of payment. In addition, this process is highly susceptible to error. Interaction complexity, delay and error, as well as a multitude of other characteristics of transaction payment can cost one or more parties to a transaction (including financial institutions) a significant amount of funds.

Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data.

The above and other difficulties in the management and coordination of financial transactions have presented administrative and cost challenges to entities involved in various aspects of transactions, including financial institutions and others.

SUMMARY

The present invention is directed to overcoming the above-mentioned challenges and others related to the types of devices and applications discussed above and in other applications. The present invention is exemplified in a number of implementations and applications, some of which are summarized below.

According to an example embodiment of the present invention, financial transactions involving financial institutions are managed using an approach generally involving the use of rules for processing payment-related aspects of the financial transactions.

In a more particular example embodiment of the present invention, a transaction management system is configured for using sets of rules associated with financial institutions for processing transactions. When transaction information is received, it is associated with a particular sponsoring financial institution. Rules for the sponsoring institution are used to process the transaction. In some instances, the rules are further selected and implemented as a function of one or more of the sponsored transaction parties (e.g., a buyer or seller).

In another example embodiment of the present invention, an automated transaction processing system is adapted for processing transactions involving a plurality of financial institutions. The system includes a central processing node adapted to audit (e.g., validate or otherwise approve) transactions between contracting parties according to different sets of transaction rules. Each of the respective sets of transaction rules are defined as a function of a unique one of the plurality of financial institutions and a relationship between the unique financial institution and at least one of the contracting parties.

According to another example embodiment of the present invention, an automated transaction processing system audits transactions between contracting parties on behalf of a plurality of financial institutions. The automated transaction processing system includes a central processing node adapted, for different transactions involving various financial institutions, to associate each transaction with a unique one of the plurality of financial institutions and to audit each associated transaction according to a set of transaction rules. These transaction rules are defined as a function of the unique financial institution and a business relationship between the unique financial institution and at least one of the contracting parties. In this regard, the audit involves using information in the rules, upon which payment can be authorized, and comparing or otherwise processing information for a particular transaction (e.g., receipt of goods, issuance of an invoice) to approve payment for the transaction (or deny payment where transaction information fails to satisfy payment-type conditions). The central processing node facilitates payment for each transaction as a function of the audit.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

Figure 1:
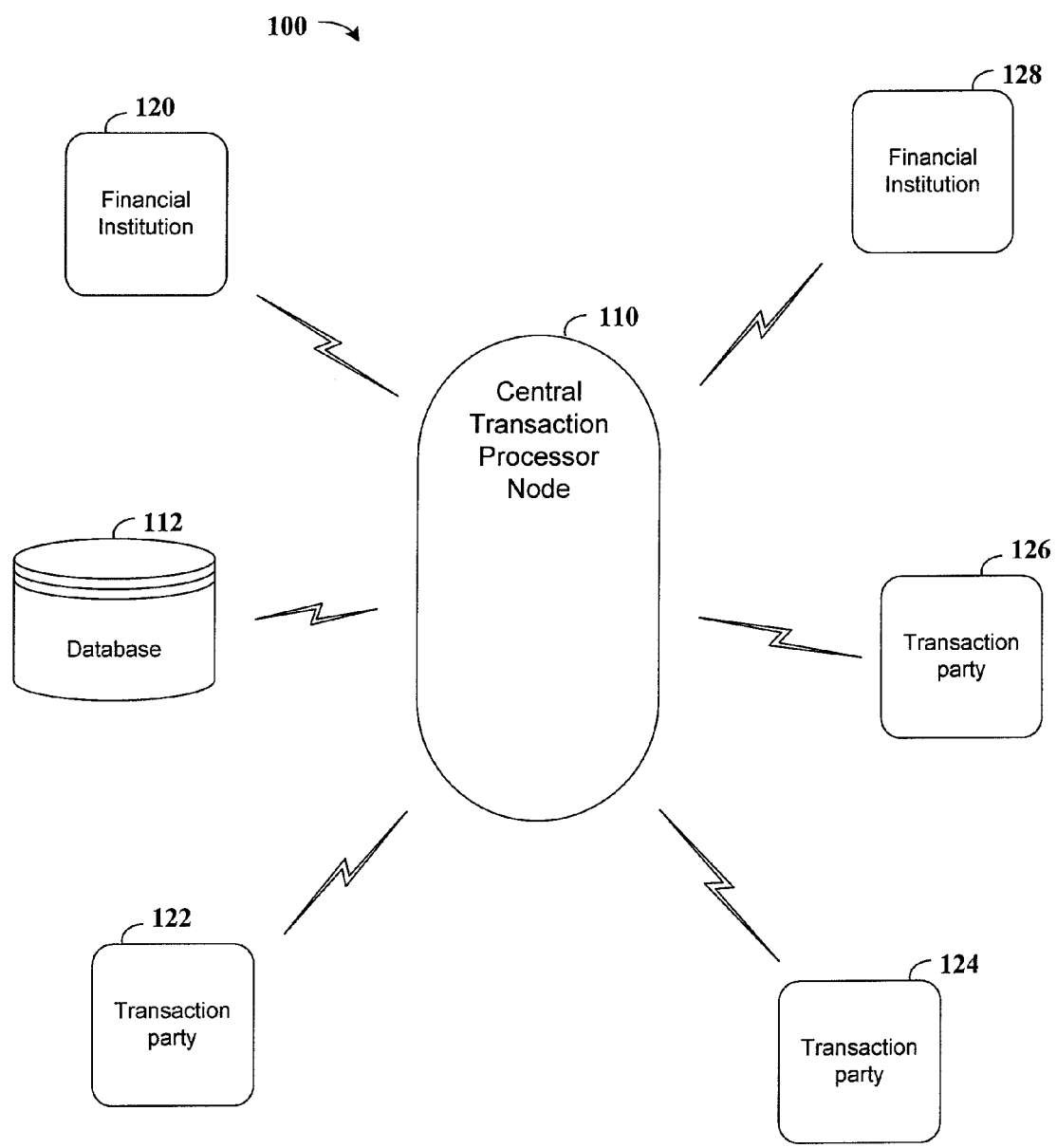
FIG. 1 shows a transaction processing arrangement, according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of communications and financial process management approaches, and has been found to be particularly useful for applications involving the operational implementation and application of financial institution rules and processes with transactions, payments, tracking and related aspects thereof. While the present invention is not necessarily limited to such approaches, various aspects of the invention may be appreciated through a discussion of various examples using these and other contexts.

According to an example embodiment of the present invention, a financial rules-based transaction approach is implemented with multiple sponsoring financial institutions for automatically processing financial transactions. The sponsoring financial institutions sponsor transaction parties (e.g., buyers and sellers); financial aspects of transactions between two or more of the sponsored transaction parties are carried out as a function of business rules for the financial institution sponsoring each party.

In another example embodiment of the present invention, a central transaction management system uses business rules (e.g., included in profile information) associated with financial institutions to process financial transactions between parties sponsored by the financial institutions. When the central transaction management system receives transaction information, the information is parsed for identifying characteristics that can be associated with sponsoring financial institutions. When these identifying characteristics match a particular financial institution, the central transaction management system uses business rules for the financial institution to process the financial transaction. In addition, when identifying characteristics for different parties to the transaction match different financial institutions, financial aspects of the transaction that are specific to each party are processed according to the each party's corresponding sponsoring financial institution. Funds relating to the financial transaction are thus transferred according to the business rules associated with sponsoring financial institutions for each party and to the particular characteristics of the financial transaction.

In one implementation, the central transaction management system audits data for transactions between the different parties as a function of business rules for one or more of the transaction parties. For example, where a particular party specifies conditions, in its business rules, upon which payment can be authorized, the central transaction management system implements those conditions in connection with the audit and determines therefrom a condition of payment for the transaction (e.g., whether some or all of a particular invoice can be paid). As another example, different parties to a contract may specify rules upon which transaction data is to be audited to indicate that the transaction is valid and/or ripe for payment. This auditing may include, for example, setting a price for a particular transaction, such as setting the price for a shipment involving bill of lading (BOL) rating or setting the price for a transaction based on characteristics of the transaction such as quantity of goods and/or receipt of the goods. In another example, the auditing involves comparing terms in transaction data from an electronic invoice to previously agreed upon contract terms; where the invoice matches the terms, or is within a tolerance where specified, the auditing results in an approval (i.e., validation of the transaction) for payment of the invoice. A multitude of such auditing approaches can selectively be implemented, based on various terms set by different transaction parties, by sponsoring financial institutions or other related entities.

In another implementation, the central transaction management system further uses business rules associated with individual parties to a transaction in processing financial transactions involving the individual parties. For instance, when the central transaction management system receives transaction information, the information is parsed (as discussed above) to identify sponsoring financial institutions as well as the parties to the transaction. The transaction is then process according to the business rules of the sponsoring financial institutions as well as the business rules of the parties to the transaction. These party-specific business rules may be stored, for example, in a user profile that is accessible by the central transaction management system. The user profiles may include identifiers used to identify buyer or seller transaction parties and/or sponsoring financial institutions.

In some instances, the sponsoring financial institution for a particular party is identified as a function of the identity of the party and corresponding business rules for the party. For example, when a party sets business rules to identify a particular sponsoring financial institution, these business rules are implemented in selecting the sponsoring financial institution. Correspondingly, the business rules for the financial institution identified by the party's business rules are used to process the financial transaction.

In other instances, two or more financial institutions can be specified by a particular party, including sponsoring and/or non-sponsoring financial institutions. Business rules for the particular party may include financial institution selection criteria that is implemented as a function of the particular transaction. For instance, selection criteria may be configured to indicate that payment for transactions under a certain value be processed (financed) using a first financial institution, while payment for transactions at or over the certain value be processed using a second financial institution. This approach may be implemented, for example, where large value transactions that may involve a longer payment period are desirably financed through a financial institution offering terms that are practicable for maintaining a longer payment term (i.e., lower rates). Small value transactions typically involving a shorter (or no) payment term may preferably be serviced using a financial institution offering desirable services or low service fees, but higher rates.

Sponsoring financial institutions may implement criteria similar to that discussed in the paragraph above for selecting a particular institution via which to process transactions, with selected criteria being implemented for making such selections. This approach may be useful, for example, where parties to the transaction agree to use a financial institution selected by the sponsoring financial institution that sponsors the party into the automated transaction process. In this regard, the financial institution selected for providing payment for a particular transaction is selectively different than the sponsoring financial institution. Such a financial institution may be selected by the sponsoring financial institution using, for example, a geographical location of a seller to which payment is to be made.

In some implementations, the central transaction management system works to keep separate the transaction rules for each financial institution (and transaction parties, where appropriate). Access to the transaction rules is restricted to the institution (or party) to which the rules belong. This restricted access approach may be implemented using, for example, encryption, passwords, tracking and other security-type measures typically implemented for data access and protection.

In some applications, a data access controller facilitates the restriction of access to transaction information by providing access to each financial institution for data relating to their clients. The data access controller selectively facilitates access via an overview type of data presentation that shows a financial overview for each customer to whom the financial institution issues credit. For example, for buyer customers, the data access controller selectively implements an overview showing each buyer's net position between payments due from the buyer and payments due to sellers (suppliers) through the transaction processing system.

In another application, the data access controller discussed above is further configured and arranged, for each sponsoring financial institution, to perform customer service functions related to transaction processing for the financial institution's customers within the transaction processing system. Such customer service functions are defined in the sponsoring financial institution's business rules in association with each customer. The data access controller implements the business rules in performing the customer service functions.

Business rules used by the central transaction management system may be stored using one or more of a variety of approaches. For example, a database accessible by the central transaction management system and having labels or other identifying characteristics that associate the business rules with a particular financial institution can be used. This database can be physically local or remote to the central transaction management system, as long as the central transaction management system can access the database and control access to the database by other entities.

The central transaction management system is further configured to interface with financial institutions for a particular transaction party, in addition to a sponsoring financial institution for the transaction party. For instance, where a transaction party has primary banking functions with a non-sponsoring financial institution, the sponsoring financial institution, via the central transaction management system, facilitates the transaction by exchanging funds via the non-sponsoring financial institution. The sponsoring financial institution may further implement processing type fees via the central transaction management system, charged for facilitating the financial transaction.

In some instances, the central transaction management system interfaces directly with financial institutions that, from a hierarchical perspective, pass-through information received from one or more parties to the transaction. The central transaction management system uses transaction rules based on the transaction information received from a financial institution. Effectively, the financial institutions use the central transaction management system to execute transaction-processing functions that are carried out using transaction-based rules specific to the particular financial institution providing the transaction information.

In other instances, the central transaction management system is adapted to interface directly with parties to a transaction and to use transaction rules based on information received from one or more of the parties (i.e., without a sponsoring financial institution). For example, a buyer or seller can interface with the central transaction management system using rules, implemented with the system, which are based on profile information for the particular buyer or seller. These parties may contract with a system administration entity, effectively acting as a sponsoring financial institution in some regards, relative to the above discussion, to facilitate transactions in this manner.

According to another example embodiment of the present invention, a central transaction management system uses transaction information for buyers and sellers of products and/or services to automatically derive pricing and/or payment options for individual transactions. These products and services may include, for example, tangible goods, shipment services, consulting services and financial services (e.g., where the seller may be a financial institution selling a financing package for a transaction between a buyer and another seller). The transaction information may include, for example, the identities of the buyer and seller, the products and/or services being purchased, the date of the purchase and the specific contract under the terms of which the transaction is being executed. For instance, specific contracts under the terms of which a transaction is being prosecuted may include prices agreed upon between a buyer and seller for a particular product and/or service.

Transaction-related contracts facilitated by the central transaction management system may also (or in the alternative) include rules agreed upon for setting certain financial and/or price terms between a buyer and seller. In one instance, terms associated with a particular transaction are automatically set by the central transaction management system to correspond to transaction information assigned to a particular buyer. The terms may be set, for example, using predetermined terms agreed to by the buyer and seller involved in the transaction. In another implementation, pricing arrangements such as quantity discounts, group discounts and conditional price variances (e.g., an acceptable percentage of variance in cost associated with for fluctuating shipping costs, product prices, financing costs and others) are further automatically implemented in response to the transaction information and the approved contract details in the central transaction management system. In still another implementation, financing terms such as processing fees for facilitating a transaction, interest-related fees, credit-extension fees and others are automatically set as a function of such a transaction-related contract. Where credit is extended, a rating engine is optionally implemented to assign an interest rate to an applicable transaction, for extending credit on behalf of a contracting party to the transaction.

Turning now to the figures, one or more of the above-discussed approaches are selectively implemented in connection with the processors and other functions shown in the figures and discussed as follows. Beginning with FIG. 1, a transaction processing arrangement 100 includes a central transaction processor 110 programmed to automatically process transaction information according to business rules corresponding to particular financial institutions, according to another example embodiment of the present invention. When transaction information is received at the central transaction processor 110, the information is associated with sponsoring financial institutions for each party to the transaction and processed according to business rules for the sponsoring financial institutions. The central transaction processor 110 may be implemented, for example, in connection with the above-discussed approaches including those involving the discussion of a central transaction management system and/or with a central transaction node in a network node-based arrangement.

Business rules are supplied by a multitude of financial institutions employing the central transaction node 110, represented here by financial institution nodes 120 and 128. In some instances, parties involved in transactions facilitated by the central transaction node also supply business rules. The central transaction processor 110 is in communication with a database 112 where transaction-related information including the above-discussed financial institution rules is stored. The database 112 is optionally coupled to (or part of) the central transaction processor 110 and further may include a plurality of data storage arrangements at different locations. The central transaction node 110 maintains separate (and secure) storage for these business rules by restricting access to the rules by the financial institutions (or others such as transaction parties).

The central transaction processor 110 is further adapted to communicate with a variety of different parties to a transaction, represented by transaction parties 122, 124 and 126. These transaction parties and the financial institutions represented by user nodes 120, 122, 124, 126 and 128 are communicatively coupled with the central transaction processor 110. The user nodes 120-128 may, for example, include one or more of a buyer, seller, distributor, shipper, carrier, government agency, financial institution or other type of individual, group or agency that would be involved in a transaction, with parties shown in the figure by way of example.

The nodes 120-128 interact with the central transaction processor 110 for providing transaction-related information, such as financial processing rules, accounting rules, orders, invoices, shipping documents, payment authorization data, payment execution data, customs documents, security documents and others. In addition, this transaction-related information may include information for relating the application of rules to transaction data, such as payment processes, credit extension and finance charges. In some instances, financial institution nodes provide rules that are stored in the database 112, with other party nodes simply interacting with the central transaction processor 110 (e.g., without providing any information for storage in the database 112). Transactions are thus processed as a function of stored rules for a particular financial institution (or institutions) with which the transactions are associated. In other instances, the database 112 is also implemented for maintaining transaction party-type information, such as user preferences (e.g., reporting, billing, credit extension) and financial institution preferences (e.g., which institution to use).

The transaction parties 122, 124 and 126 may be implemented via sponsoring financial institutions, with nodes 122, 124 and 126 representing this combination of transaction parties with a particular sponsoring financial institution. This combinatorial representation may also maintain direct interaction between transaction parties and the central transaction processor 110 for facilitating party-specific communications, such as for setting business rules or profile information for individual parties.

In some implementations, one or more of the nodes 120-128 are used as interfaces to the central transaction processor 110, with users at the nodes being able to provide transaction-related information such as classification rules. In other implementations, the central transaction processor 110 automatically accesses information from the user nodes for a variety of purposes, such as retrieving classification rules (e.g., accounting codes and/or business rules) or updating related accounting fields. This interaction between the nodes and the central transaction processor 110 is controlled using, for example, access authorization such as those involving password-protected authorization and others.

When transaction data is received at the central transaction processor 110 for financial institution-type processing, the central transaction node parses the data and automatically associates the transaction data with a particular financial institution sponsoring the transaction to which the data applies. This automatic association is implemented using business rules in the database 112 and/or as a function of the node sending the transaction data. In some instances, profile information for various sponsoring financial institutions (and/or transaction parties) is stored in the database 112 and used in connection with identifiers in received transaction information to automatically associate the transaction information with sponsoring financial institutions. The central transaction processor 110 processes the associated data according to applicable business rules that may be tailored, for example, to a particular type of transaction or to particular transaction characteristics.

Where credit is extended on behalf of users, the central transaction processor 110 selectively assigns an interest rate to the extension of credit, either directly wherein an administrator of the central transaction processor extends credit, or in connection with an interest rate offered by a financial institution extending the credit. In some applications, the central transaction processor 110 implements a rating engine to assign an interest rate to an applicable transaction, for extending credit on behalf of a contracting party to the transaction. The rating engine uses information about the contracting party in order to establish such an interest rate.

In another example embodiment, the central transaction processor 110 is further adapted to grant and control information exchange with the database 112 as a function of inputs received from the nodes 120-128, such as authorization inputs and transaction-specific inputs. When users at one of the nodes 120-128 attempt to send information to or retrieve information from the central transaction processor 110, authorization information from the users is used to control the information transfer. The authorization information may include, for example, access-type information (e.g., a password or user ID) or simply document information that the central transaction processor 110 recognizes.

In another example embodiment, the central transaction processor 110 maintains data for business rules and processed transactions over time for a variety of purposes, such as for generating reports, tracking compliance and for taking appropriate action where errors or non-compliance occurs. For example, when a particular transaction is processed or when business rules are changed, the central processor monitors associated information and stores and/or processes the monitored information for these purposes.

The user profiles and/or business rules discussed herein in connection with FIG. 1 above and otherwise may include a variety of information for use in transaction management and financial processing. For instance, in addition to the above-discussed approaches, a typical such profile may include one or more of the following data: general ledger charts of accounts, identification of computer systems submitting contract or transaction data, customer lists, vendor lists, financial institution lists, contract and price approval policies, transactional approval policies, business rules, operational roles (e.g., defining what functions a user associated with that role can perform), organizational hierarchy (e.g., defining how much of a company's data a user associated with a particular organizational node can access), and individual users. Financial institution profiles may also include information further defining the business relationship with selected customers or other financial institutions and financial processing organizations from the financial institution's perspective.

Figure 2:
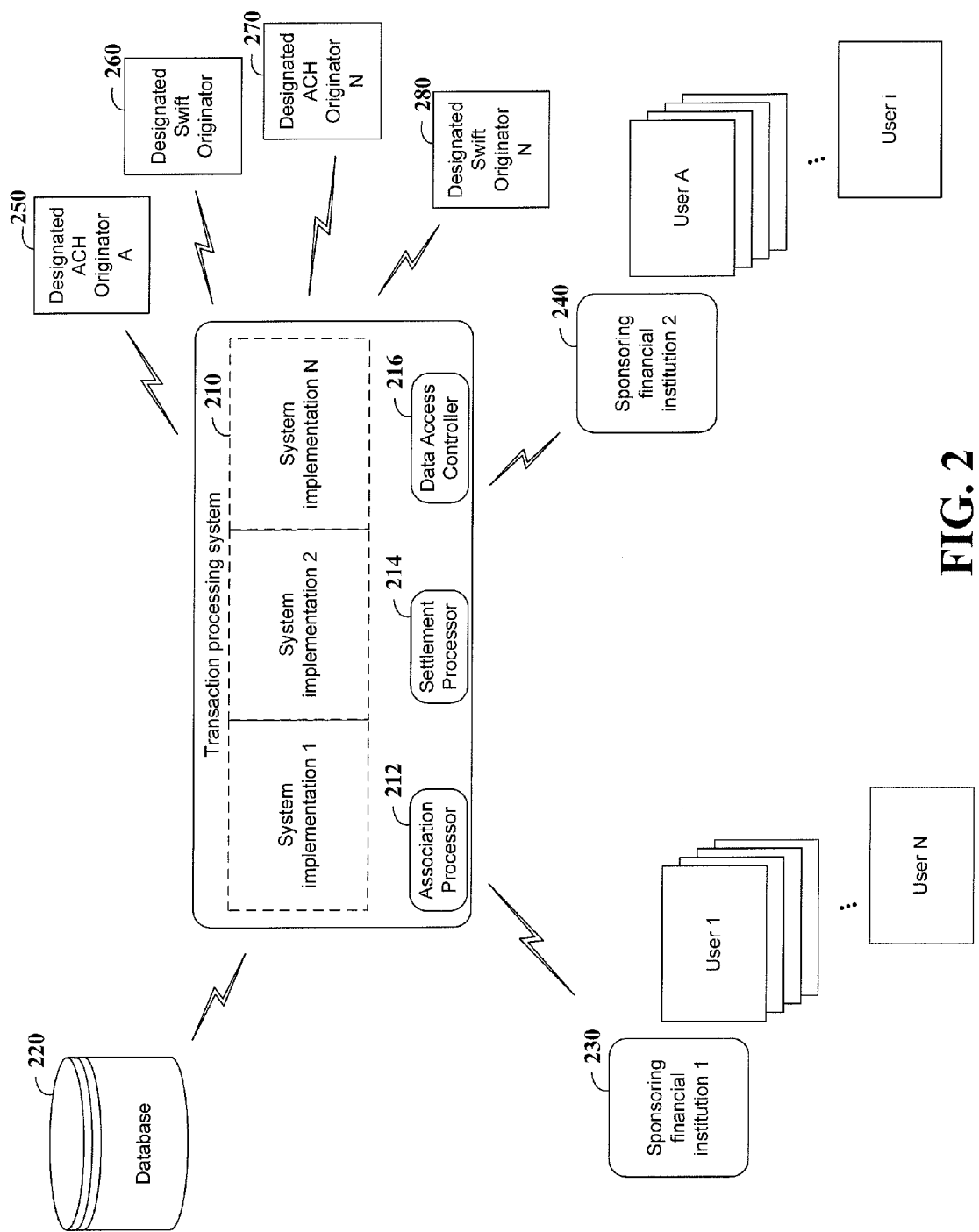
FIG. 2 shows an arrangement and approach for transaction management, according to another example embodiment of the present invention.

FIG. 2 shows an arrangement and approach for transaction management in an automated transaction network, according to another example embodiment of the present invention. A transaction processing system 210 interfaces with a plurality of financial institutions for facilitating transactions, using data stored in a database 220 for implementing rules for the transactions. These rules are used to process financial aspects of the transactions, relative to information received via sponsoring financial institutions.

Two sponsoring financial institutions (230 and 240) are shown, with multiple such institutions being contemplated but not shown for brevity. Each sponsoring financial institution 230 and 240 works with multiple users, represented as users 1-N for institution 230, and users A-i for institution 240. Communications between the sponsoring financial institutions and the transaction processing system 210, as shown by communication links, may be implemented directly from the sponsoring financial institutions. In addition, the shown communication links may represent a direct communication from a sponsored user, the user including in the communication sufficient information (and security type information, where appropriate) to designate the appropriate sponsoring financial institution.

The transaction processing system 210 also interfaces with a variety of funds processing originators. By way of example, automatic clearing house (ACH) originators 250 and 270, and SWIFT (a European-based, straight through processing (STP) transaction system) originators 260 and 280 are shown. These funds processing originators are typically implemented as financial institutions having appropriate funds processing capabilities for implementing, for example, ACH or SWIFT-type functions. In this regard, the transaction processing system 210 interfaces with financial transaction processing entities for obtaining authorization to proceed with a transaction and to coordinate fund transfer using the respective originators (i.e., as conventional). The transaction processing system's interface with ACH and other providers is selectively specified by business rules used in processing a particular transaction for payment and facilitation functions.

The business rules in database 220 typically include user-specified rules that are provided by the financial institutions using the transaction processing system 210 for processing financial transactions. For example, user profile information for each sponsoring financial institution can be stored in the database 220 for use by the transaction processing system 210. This profile information may include, for example, business rules specifying one or more various conditions or approaches related to financial transaction processing, as discussed herein. For more information regarding transaction processing in general, and for specific information regarding the use of user profiles and business rules for transactions, as well as computer and processing arrangements and systems for use with the same (and as may be implemented in connection with one or more example embodiments herein), reference may be made to U.S. Pat. No. 7,496,519 (USBA.101PA), entitled "Automated Transaction Processing System and Approach" and filed May 12, 2003, and to U.S. Pat. No. 5,910,896 (USBA.002PA) filed Nov. 12, 1996, all of which are incorporated herein by reference.

When the transaction processing system 210 receives transaction data identifying a particular sponsoring financial institution, the database 220 is accessed to retrieve profile information (and corresponding business rules) for processing the transaction data. The business rules are used to determine a variety of transaction-related characteristics, such as fees to be charged for different parties to the transaction, including buyer, seller and their respective financial institutions. Additional rules-based processing examples are discussed further below.

The storage of information in the database 220 may involve the use of a single database, or may involve multiple databases, either in a single or at multiple locations, communicatively coupled with the transaction management system 210. In one implementation, all transaction data for all buyers and sellers sponsored by all financial institutions is stored in one centralized database. The transaction management system 210 manages the centralized database such that information in the database that has a common relationship with other information in the database can be cross-referenced and updated. For instance, where information for a buyer and seller for a single transaction is stored in the centralized database, updates made to the buyer's information can be appropriately made to similar seller's information. This approach can be implemented to ensure that any buyer and any seller can do business with each other and see up-to-date status and documents without latencies typically involved attempting to replicate and synchronize data across multiple databases.

Business rules stored in the database 220 are optionally tailored to particular users that are being sponsored by the financial institution. In this regard, the business rules pertaining to a particular sponsoring financial institution, as well as the user being sponsored for a particular transaction, are retrieved from the database 220 and used accordingly. In some instances, sponsored users also store profile information in the database 220, such as preferred banking institution (i.e., with the sponsoring financial institution simply sponsoring the transaction for a fee and not funding the transaction).

In some instances, the transaction processing system 210 includes two or more system implementations, represented by system implementations 1 and 2-N. These system implementations may involve virtually separate implementations at a single location to facilitate data security and continuity for particular sponsoring financial institutions. For instance, each system implementation may be implemented for a particular financial institution, with communication between each system implementation and other system implementations being facilitated within the transaction processing system 210. In this regard, each user (sponsoring financial institution) may tailor its specific system implementation to its own needs.

The system implementations with transaction processing system 210 may also be implemented at physically separate locations, with virtual ties to the transaction processing system 210. For example, the implementation of various aspects of the transaction processing system may be appropriate for applications in different countries or for point-of-use type applications (e.g., to reduce long distance data communications). This physically separate approach may also be implemented, for example, to address laws associated with transactions, including taxation and other processing rules.

As discussed above, various business rules stored at the database 220 are implemented by the transaction processing system 210 for a variety of transaction characteristics. One such characteristic involves the determination of fees to be charged to users (buyers and sellers), to sponsoring financial institutions and, where applicable, to other financial institutions involved in the transaction. In this regard, the database 220 stores business rules characterizing these fees, and the transaction processing system 210 uses these characterizing business rules to process financial transactions. In addition, the database 220 may store party-identifying information for use by the fee-based rules in characterizing the fees to be assessed for a particular transaction.

In some applications, the business rules are implemented to arrive at a collaborative transaction term, such as a price or other term automatically implemented as an agreed-upon term by using previously agreed-upon business rules for generating such a term. Fee-based rules implemented in connection with these approaches may involve, for example, information for determining the amount of fees to assess for one or more of the following:

fees to be charged to the seller for the transaction based on the identity of the seller and the identity of the seller's sponsoring bank;

fees to be charged to the buyer for this transaction based on the identity of the buyer and the identity of the buyer's sponsoring bank;

fees the seller's sponsoring bank owes the buyer's sponsoring bank for this transaction;

fees the buyer's sponsoring bank owes the seller's sponsoring bank for this transaction; and fees the buyer's sponsoring bank and the seller's sponsoring bank owe the transaction processing system 210 for this transaction.

These collaborative type terms and approaches for implementing the same are selectively carried out using, for example, the transaction processing arrangement 100 shown in FIG. 1 and/or the transaction processing system 210 shown in FIG. 2, with transactions involving buyers and sellers sponsored into the processing network by a sponsoring bank. In these approaches, for each of a plurality of transactions involving a buyer and a seller, an association processor 212 identifies a particular sponsoring bank for each buyer and seller as a function of stored identifiers. The association identifies respective business rules, set in accordance with the particular sponsoring bank and the particular buyer or seller for which the rules are set, for respectively processing transactions on behalf of the buyer and on behalf of the seller for a particular transaction. These and other association processor 212 functions can be implemented separately from or in connection with (e.g., as a software-implemented function) the transaction processing system 210.

In some applications, the association processor facilitates the identification of business rules using a geographic location of a party to the transaction, for example where transaction payment characteristics are affected by such a location (e.g., where tariffs and/or taxes are involved).

In other applications, the association processor identifies business rules for a sponsoring financial institution using historical information for a particular transaction party. For example, where a financial institution implements different sets of business rules based on payment characteristics, credit rating, business volume or other historical-type information pertaining to a transaction party, that information is used to select a set of business rules to use in facilitating a transaction involving the transaction party.

A collaborative contracts processor uses the identified business rules and a business agreement between the buyer and seller to determine the amount of fees assessed in accordance with one or more of the above fees discussed in connection with the fee-based rules. Other approaches involving a collaborative contracts approach are discussed further below.

Turning back to FIG. 2 and with approaches involving the above assessed fees, the transaction processing system 210 uses information in profiles for facilitating the transfer of funds from, or the extension of credit on behalf of, the entity to which fees are assessed. For instance, where a particular fee is to be assessed against sponsoring financial institution 230 and/or one of the users 1-N, funds from that institution are provided directly (e.g., funds transfer) or indirectly (e.g., extension of credit), from the sponsoring financial institution 230 or from another financial institution specified by the user, where applicable.

The user (e.g., buyer, seller and financial institution) profiles discussed herein and implemented with collaborative-type approaches may include a variety of information for use in transaction management and otherwise. In some applications, typical profiles include one or more of the following data: a general ledger chart of accounts, identification of a computer system authorized for submitting contract or transaction data, customer and/or vendor lists, policies for contract, price or transactional approval and business rules. Where individuals within an organization participating in the collaborative-type approaches are selectively authorized, operational roles for such users are defined and include, e.g., access authorization for the users as well as individual access tracking. Seller customer list profiles may also include information further defining the business relationship with the customer from the Seller's perspective, for example, such as a retail buyer relationship or a wholesale buyer relationship. List profiles for buyers who act as vendors (e.g., as a seller or distributor) may also include information further defining the business relationship with the vendor from the Buyer's perspective.

In one particular implementation, profile information such as business rules, operational roles, authorization levels and/or other attributes are specific to particular levels and/or individuals within a particular entity. This profile information is stored for access by the transaction processing system 210 and used for implementing transactions. For example, when a particular financial institution or sponsored user includes different subsidiaries, divisions or locations, profile information can be tailored for the particular source. Certain profile information can also be implemented to supersede other profile information, for example, when a particular subsidiary is assigned different specific pricing terms, relevant to another subsidiary of a common entity.

In another example embodiment facilitating collaborative approaches, the transaction processing system 210 stores information for transaction parties including one or more of financial institutions and sponsored users (e.g., buyers and sellers), and communicates therewith using an identification approach for users at the buyer and/or seller level. The transaction processing system 210 controls access to the stored information as a function of user identification (ID), with access parameters controlled for processes such as contract modification, price modification, display configuration, access to the stored information for that particular user and others.

As an example using seller offerings that make up at least part of the stored information for a particular seller as well as buyer access controls, the seller offerings are automatically configured for usage by the individual users. In this context, seller offerings may involve real goods and/or services, as well as or in the alternative to financial offerings, such as the extension of credit and/or financial processing services. The automatic configuration may, for example, include price, delivery and payment options. In response to the seller offerings and other stored information, the transaction processing system 210 is adapted for accepting requests from buyers and communicating the requests to the seller. The transaction processing system 210 is further adapted for accepting acknowledgment of receipt by the buyer either manually (e.g., an individual buyer logs into the system with a user ID and confirms receipt) or electronically (e.g., buyer's inventory receiving systems automatically generate and transmit a detailed notice of receipt or acceptance). Once receipt or acceptance is acknowledged, the system communicates that acknowledgment to the seller. In one implementation, the system is further adapted for automatically paying the seller in response to the receipt/acceptance acknowledgment. In another implementation, the system is further adapted to invoice the buyer for the offerings. Further, "payment" in this context may involve the drawdown of a credit line, or extension of credit in manners as appropriate for the particular transaction.

In some applications, the transaction processing system 210 implements a settlement processor 214 in connection with facilitating payment for a particular transaction between a buyer and a seller. The settlement processor 214 performs inter-bank settlement by calculating the amount of funds to be collected from a sponsoring bank for the buyer and remitted to a sponsoring bank for the seller. The settlement is used to fund a payment that the seller's sponsoring bank will make to the seller for all transactions that achieve payable status, e.g., within a payment period defined as a function of the business rules.

The settlement processor 214 is implemented to facilitate payment/settlement in a variety of manners, depending upon the application and appropriate contract terms and other information relative to the transaction parties and/or sponsoring financial institutions involved in a particular transaction. In this regard, some applications involve one or more of the following electronic payment approaches as facilitated by the settlement processor 214 for a transaction involving a buyer and a seller, with sponsoring banks for each. In one approach, the settlement processor 214 facilitates the submission of an electronic payment demand at a defined period to the buyer's sponsoring bank for all net monies due to at least one of the transaction processing system and the seller's sponsoring bank, when the buyer's sponsoring bank is in a net funds due (to the transaction processing system) position. In another approach, the settlement processor 214 facilitates the submission of an electronic payment demand at a defined period to the seller's sponsoring bank for all net monies due to at least one of the transaction processing system and the buyer's sponsoring bank, when the seller's sponsoring bank is in a net funds due position. In another approach, the settlement processor 214 facilitates the submission of an electronic payment notice at a defined period to the buyer's sponsoring bank for all net monies due to the buyer's sponsoring bank, after subtraction of funds due to at least one of the transaction processing system and the seller's sponsoring bank, when the buyer's sponsoring bank is in a net funds due processor position. In still another approach, the settlement processor 214 facilitates the submission of an electronic payment demand at a defined payment period to the seller's sponsoring bank for all net monies due to the seller's sponsoring bank after subtraction of funds due to at least one of the transaction processing system and the buyer's sponsoring bank, when the seller's sponsoring bank is in a net funds due to processor position. In each of the above approaches, the net funds due to processor position selectively characterizes funds due, and in certain applications, characterizes funds due to an administrator of the transaction processing system 210 for transaction payment (e.g., from a buyer to a seller) and/or for fees associated with the processing of the transaction payment.

In another implementation, the transaction management system discussed in the preceding paragraph is further adapted for accepting a receipt of purchase acknowledgment including receipt characteristics. For example, characteristics such as total acceptance of goods, partial acceptance of goods and rejection of goods at the invoice or receipt line item level can be included in the acknowledgment. These characteristics are tied to transaction levels involving users sponsored by the financial institutions (e.g., 230 or 240, shown by way of example). Where compliance before payment for a transaction is executed is to be ensured, this information is required to be verified a priori. An invoice or invoices for a particular transaction are updated with this and other transaction-fulfillment-related information. Using this approach, problems with received purchases, such as damaged goods, improper goods and improper financial terms are readily addressed. The various invoicing and payment-related characteristics are correspondingly modified (e.g., payment is only made for accepted portions of goods, or credit for the cost of returning goods is granted, or payment is made using only accepted terms such as those relating to an accepted credit-related interest rate).

In a more particular example embodiment, financial institutions approve financial contracts using a collaborative contract manager and submit order and invoice quantities for executing the contracts to the transaction processing system 210 (e.g., implementing a collaborative contract manager). The transaction processing system 210 then uses the terms from the collaborative contracts manager to establish financial processing terms (e.g., credit rate or other cost) between a user of financial services and the corresponding financial service provider. In one instance, financial service providers use the collaborative contracts manager as the central repository called by various provider systems. In another instance, the financial service user implements the collaborative contracts manager as the central repository called by various procurement systems.

For general information regarding the implementation of transaction functions and for specific information regarding collaborative-type functions that can be implemented in connection with one or more example embodiments discussed herein, reference may be made to U.S. Pat. No. 7,496,519 (USBA.101PA) and to U.S. patent application Ser. No. 10/437,405 (USBA.117PA), both filed on May 12, 2003 and fully incorporated herein by reference.

In another embodiment, the transaction processing system 210 is configured for settling inter-bank issues relating to fees and/or other transaction characteristics. When a buyer and seller enter into a transaction, the transaction processing system 210 calculates the amount of funds to be collected from the buyer's sponsoring bank and remitted to the seller's sponsoring bank. These funds are used to fund the payment that the seller's sponsoring bank will make to the seller for all transactions that achieve payable status within a particular payment period (e.g., a network day) for the transaction processing system's.

Once the amount of funds to be collected are determined, the transaction processing system 210 further acts to facilitate the collection of these funds in one or more of a variety of manners. For instance, the transaction processing system 210 may simply make the amount of funds known to parties to the transaction using conventional communications methods. In other instances, the transaction processing system 210 actively facilitates collection of these funds.

In one example, an electronic payment demand is submitted on an interval (e.g., at least daily) to the buyer's sponsoring bank for all net monies due either to the transaction processing system or to the seller's sponsoring bank when the buyer's sponsoring bank has net funds due. An electronic payment demand is also submitted on an interval to the seller's sponsoring bank for all net monies due either to the transaction processing system or to the buyer's sponsoring bank when the seller's sponsoring bank has net funds due. In addition, an electronic payment notice is submitted on an interval (e.g., at least daily) to the buyer's sponsoring bank for all net monies due to the buyer's sponsoring bank. The net monies due are contemplated after subtraction of funds due to either the transaction processing system or the seller's sponsoring bank when the buyer's sponsoring bank has net funds due. An electronic payment notice is also submitted to the seller's sponsoring bank for all net monies due to the seller's sponsoring bank. Similarly as above, these net monies due are contemplated after subtraction of funds due to either the transaction processing system or the buyer's sponsoring bank when the seller's sponsoring bank has net funds due.

In connection with the various example embodiments discussed in connection with FIG. 2 (and otherwise), a fee engine is selectively implemented to facilitate the assessment of transaction processing fees. In some applications, the fee engine is implemented with a transaction processor (e.g., with transaction processing system 210), as a software-implemented engine. In this regard, fees such as those assessed in accordance with a business relationship between a financial institution and a buyer or seller party contracting therewith, or with a business relationship between a financial institution and an administrative transaction processor auditor, can be assessed using the fee engine. That is, the fee engine applies a fee appropriate for each transaction, and either directly or indirectly facilitates payment of that fee.

Access to information at the database 220 is controlled in one or more of a variety of manners, with information made available to users selectively and in a variety of formats, depending upon the implementation. Various examples using this general approach are discussed below. These examples are selectively implemented with a data access controller 216 and may involve approaches discussed above in connection with similar data access controller functions.

In one example embodiment, each buyer-sponsoring financial institution and each seller-sponsoring institution has access to the transactions naming their sponsored buyer or seller organization. By enabling such access, each financial institution is granted access to perform customer service functions related to transaction processing for their customers within the transaction processing system. These customer service functions may, for example, include the provision of accounting-related data in an appropriate format and at a selected interval, or include providing a notification to the customer upon certain predefined events related to transaction processing and/or financial status of transactions or accounts. In addition, each financial institution can maintain an overview of their net position with each of their customers to whom they are issuing credit. The financial institution is presented a view into the transaction processing system that shows their customers' net position between payments due from customer and payments due to suppliers (through the transaction processing system).

In another embodiment, each buyer-sponsoring financial institution has the capability, as enabled by user profiles stored at the database 220, to specify a variety of bank-specific operating characteristics. For example, each buyer-sponsoring financial institution may specify the financial institution that is to perform foreign currency translation on its sponsored buyer's behalf. This approach may be implemented, for example, where the seller desires to be paid in currency local to the seller and the buyer desires to be billed in currency local to the buyer. Each buyer-sponsoring financial institution may also specify a currency translation markup amount to add to translation services being provided to its buyers. The buyer-sponsoring financial institution may also specify the financial institution to use for remittance collection from its buyers. For general information regarding transaction processing, and for specific currency conversion implementations that may be implemented in connection with currency conversion as discussed here in connection with FIG. 2, reference may be made to U.S. patent application Ser. No. 11/104,394 (USBA.134PA), filed on Apr. 12, 2005 and entitled "Automated Transaction Processing System and Approach with Currency Conversion," which is fully incorporated herein by reference.

Seller-sponsoring institutions may also specify the financial institution(s) to use for delivering payments to the seller. For instance, one institution may be used for ACH origination for sellers holding US-domiciled bank accounts and another institution (e.g., a SWIFT institution) for European-based sellers, and another for Latin American-based sellers.

Financial institutions issuing credit to either the buyer or the seller can also specify where credit-related information is retrieved from for use in the transaction. For example, the location from which credit drawdown advice (e.g., relative to available credit in an appropriate credit account) is to be delivered can be specified. In addition, credit-issuing financial institutions can specify whether the drawdown advice is to include transaction details or simply be the aggregate of the transaction details for the reporting period. For the latter case, the transaction processing system 210 can be specified to be used as the detailed subledger to support the credit usage. In this sense, the transaction processing system 210 functions much like conventional credit-issuing institutions (including credit card issuing institutions), with the credit issuer being provided summary or detail information.

A variety of security-related functions are implemented with the transaction management system 210, depending upon the application and the desired level of security. For example, in some implementations, data flowing to the transaction processing system 210 from sponsoring financial institutions (230, 240) are encrypted using standard encryption technologies. Similarly, data flowing from the transaction processing system 210 to sponsoring financial institutions (230, 240) can also be encrypted using standard encryption technologies. Communications between any distributed computing devices and the transaction processing system 210 can also be encrypted using standard encryption technologies. For instance, where the various system implementations 1, 2 and N are employed at physically different locations, communication between these system implementations and the transaction management system 210 is encrypted.

In addition to security-related functions for transaction communications, access to data within the transaction processing system 210 can also be controlled using security measures. For instance, profiles stored in the database 220 may include security type information, such as password and/or encryption information that users accessing the transaction management system 210 may employ.

In some instances, the transaction processing system 210 addresses synchronization issues between various financial institutions and organizations, such as those discussed above, by implementing pricing and/or other transaction rules that have previously been agreed upon such that disputes over transaction price are typically eliminated. These rules may include, for example, criterion defining pricing data that can be automatically approved (e.g., transaction fees within a selected variance), and also control pricing information made available to different users. The pricing rules may also include, for example, prices associated with particular transaction characteristics, with different prices being assigned for particular transactions (e.g., such as with a volume or amount discount).

In various other example embodiments of the present invention, a credit-processing approach is implemented with a transaction management arrangement, such as that shown in FIG. 2 and discussed above. For example, the transaction processing system 210 can facilitate the extension of credit on behalf of one or more sponsoring financial institutions, or another financial institution, in connection with a particular user participant in a transaction.

In one such credit-processing implementation, a buyer-sponsoring bank sponsors a buyer into the transaction processing system 210 and network with an active connection to a line of credit for usage within the transaction processing system and network. The buyer creates trading partner relationships with sellers who are sponsored into the transaction processing system 210, which facilitates the relationships and related transaction processing. When a buyer makes a purchase from a seller, the buyer sends an electronic copy of an order for the purchase to the transaction processing system 210 and network. The seller fulfills an order and issues an invoice electronically to the transaction processing system 210.

Where particular events are to occur and/or conditions are to be met before an invoice becomes payable, these events or conditions are provided by an appropriate party to a transaction (e.g., buyer, seller or third party (such as customs or a freight forwarder)). These events and/or conditions can be specified using business rules as discussed above, with the transaction processing system 210 implementing the business rules.

The transaction processing system 210 uses business rules and/or profiles for users to match incoming information such as order, invoice, receipt and/or event notices. This incoming information is audited and reconciled by the transaction processing system 210 using appropriate business rules. For example, where a buyer establishes profiles, the transaction processing system 210 implements those profiles to audit and reconcile the information.

Where payment is ripe as determined, e.g., via an audit as discussed above, and where payment is via the extension of credit, the transaction processing system 210 verifies that the extension of credit to the buyer and/or associated buyer party is appropriate. Where the extension of credit is appropriate, the transaction processing system 210 sends authorization to the appropriate financial institution following rules established by that financial institution via profiles within the transaction processing system.

When authorization is received and all other conditions required for payment are met, the transaction processing system and network electronically funds a seller with a single payment across all credit issuing institutions via a funds delivery pathway specified in the seller-sponsoring financial institution's profile. In some instances, the cost to the seller for this payment is varied based on the financial institution supplying the credit. The funds are delivered to the seller net of the seller-sponsoring bank's fees to the seller (e.g., fees are withheld prior to delivery of payment). The seller-sponsoring financial institution uses the pricing capabilities of the transaction processing system and network to compute and render the bill to the seller. Detailed data supporting the payment continues to reside in the transaction processing system and network and does not add overhead to the banking industries money movement networks.

In connection with the authorization above, the transaction processing system 210 provides the buyer-sponsoring bank with a data feed that enables it to update its credit line to the buyer to acknowledge the draw down of that credit line to pay invoices. In some instances, the buyer-sponsoring bank will also use the transaction processing system 210 to calculate and render the invoice to the bank's buyer customer, and facilitates the linking of transaction data to the invoice. In these instances, the buyer-sponsoring bank provides the transaction processing system 210 with information for processing the invoice accordingly, in profile and/or business rule information.

Figure 3:
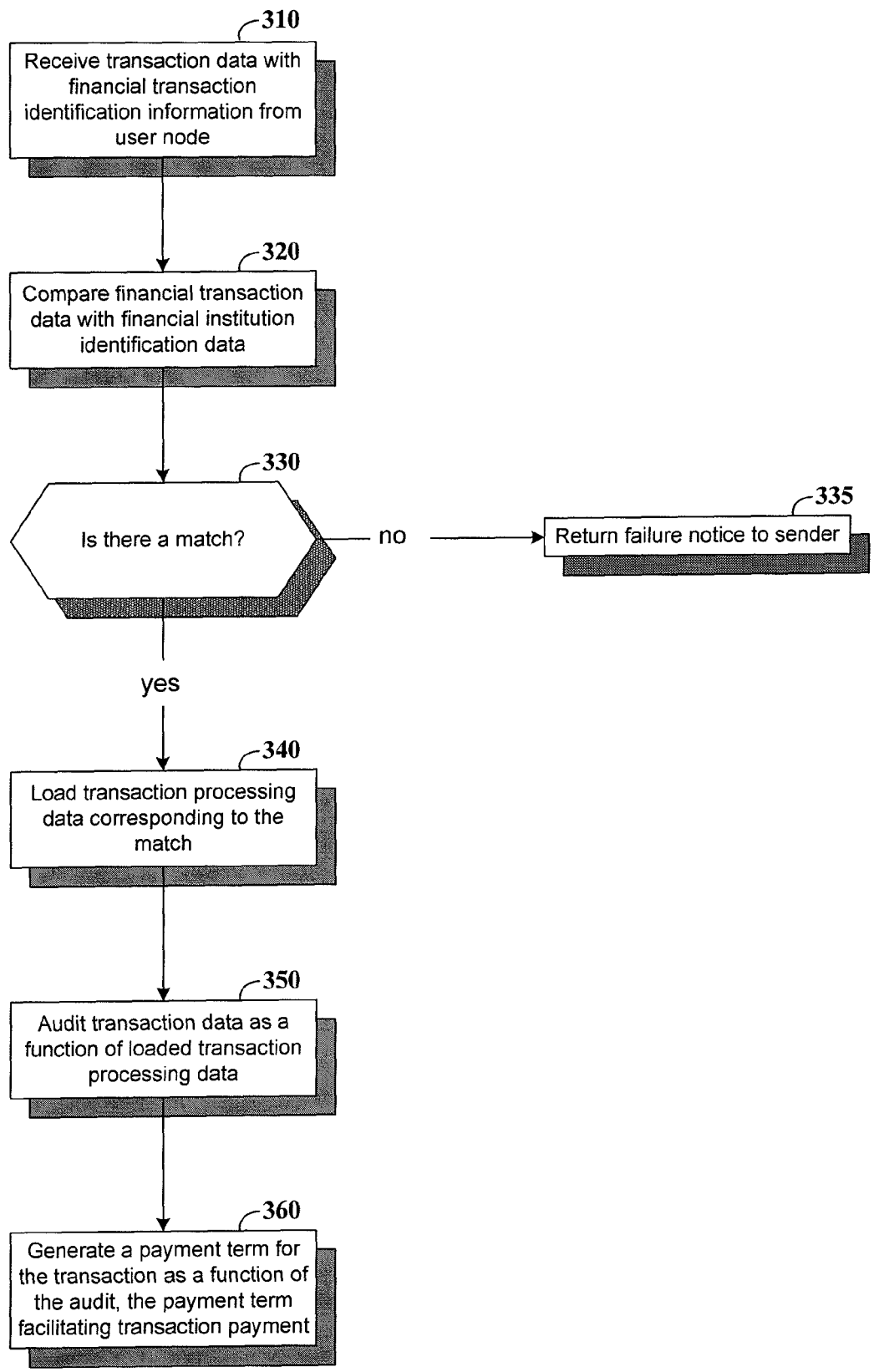
FIG. 3 shows a flow diagram for transaction processing, according to another example embodiment of the present invention.

FIG. 3 shows a flow diagram for transaction processing involving the association of a particular financial institution with a transaction, according to another example embodiment of the present invention. At block 310, transaction data having financial transaction identification information is received from a user node. The financial transaction identification information may include identification data that pertains, for example, to a particular party to the transaction, to a financial institution or to other identification information specific to the particular transaction to which it applies. At block 320, the financial transaction data is compared with financial institution identification data. If no match between the financial transaction data and a financial institution is found at block 330, a failure notice is returned to a sender at block 335 indicating that the transaction cannot be processed.

If a match between the financial transaction data and a financial institution is found at block 330, transaction processing data corresponding to the match is loaded at block 340. In some instances, this loaded transaction processing information includes information exclusively provided by a financial institution that is the subject of the match. In other instances, the loaded transaction processing data includes information for parties to the transaction in addition to the financial institution that is the subject of the match (e.g., for specifying user preferences or profiles as discussed above).

After the transaction processing data has been loaded, it is used to audit the transaction data at block 350 for facilitating financial aspects of the transaction. The audit generally involves parsing the financial transaction data using loaded processing data such as rules that can be implemented to specify whether the financial transaction data indicates that payment can be made. For instance, a price term engine can be used to derive a payment amount for the financial transaction, using information in the financial transaction data and in the loaded transaction data (e.g., specifying pre-agreed contract terms used in arriving at a price). Such a price term can be used for setting the price of one or more aspects of the financial transaction data. The audit is then used at block 360 to generate a payment term for the transaction, and the payment term is used to facilitate payment for the transaction. In this regard, the payment term may include one or more of a payment amount, a time of payment, a credit term, a method of payment or a source from where to draw the payment.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. An automated transaction system, comprising:
a correlation database that stores:
data identifying a plurality of profiled parties including a plurality of financial institutions, a plurality of buyers and a plurality of sellers;
data identifying a plurality of contract-defined transactions between the plurality of buyers and the plurality of sellers;
contract-defined terms for the plurality of contract-defined transactions;
a plurality of sets of business rules defined for respective profiled parties from among the plurality of profiled parties,
a plurality of sets of transaction processing rules defined for respective profiled parties from among the plurality of profiled parties, and
cross-correlation data for correlating each respective contract-defined transaction from among the plurality of contract-defined transactions with data identifying profiled parties from among the plurality of profiled parties for the respective contract-defined transaction;
a transaction-tracking database configured to store data indicating validity for payment for each of the plurality of contract-defined transactions; and
one or more processors configured to:
respond to externally-generated transaction-related data by accessing the correlation database to identify a related contract-defined transaction from among the plurality of contract-defined transactions, wherein the related contract-defined transaction is related to the externally-generated transaction-related data, wherein the contract-defined terms for the plurality of contract-defined transactions include contract-defined terms for the related contract-defined transaction,
associate the related contract-defined transaction with:
data identifying particular profiled parties from among the plurality of profiled parties;
particular sets of business rules from among the plurality of sets of business rules; and
particular sets of transaction processing rules from among the plurality of sets of transaction processing rules,
wherein the particular sets of business rules are defined for the particular profiled parties, wherein the particular sets of transaction processing rules are defined for the particular profiled parties, wherein the particular profiled parties include a particular seller from among the plurality of sellers,
process the contract-defined terms for the related contract-defined transaction and the particular sets of business rules to determine a payment term of the related contract-defined transaction,
track occurrences of one or more events associated with the related contract-defined transaction and update the data indicating validity for payment for the related contract-defined transaction as a function of the one or more events associated with the related contract-defined transaction,
audit the related contract-defined transaction using the business rules to determine a condition of payment authorization for the related contract-defined transaction, wherein the particular sets of business rules specify that the one or more events associated with the related contract-defined transaction are to occur before an invoice associated with the related contract-defined transaction becomes payable,
in response to the condition of payment authorization indicating that payment is authorized, use the payment term and the contract-defined terms for the related contract-defined transaction to calculate an amount to be paid to a sponsoring financial institution for the particular seller,
generate, based upon the particular sets of business rules, an electronic payment instruction, and
output the electronic payment instruction to effect payment of the calculated amount to be paid to the sponsoring financial institution for the particular seller.

2. The automated transaction system of claim 1, wherein:
the particular profiled parties include a particular financial institution from among the plurality of financial institutions,
the electronic payment instruction is to perform inter-bank settlement for applicable transactions from among the plurality of contract-defined transactions to transfer funds owed to and by the particular financial institution to cover payment for the applicable transactions, the applicable transactions occurring during a transaction period and involving the particular financial institution, and
the one or more processors are configured to store data for tracking payments made relative to each of the applicable transactions.

3. The automated transaction system of claim 1, wherein:
the particular profiled parties include a particular financial institution from among the plurality of financial institutions, and
the one or more processors are configured to:
calculate a net position of the particular financial institution according to a difference between funds owed to and owed by the particular financial institution for all applicable transactions from among the plurality of contract-defined transactions, the applicable transactions occurring during a transaction period,
in response to the calculated net position showing a net amount owed to the particular financial institution, generate and output the electronic payment instruction to transfer funds to the particular financial institution in an amount of the calculated net position, and
in response to the calculated net position showing a net amount owed by the particular financial institution, generate and output an electronic payment demand instruction to transfer funds from the particular financial institution in the amount of the calculated net position.

4. The automated transaction system of claim 1, wherein:
the related contract-defined transaction occurs during a transaction period,
the particular profiled parties include a particular financial institution from among the plurality of financial institutions, and
the one or more processors are configured to:
calculate a net position of the particular financial institution according to a difference between funds owed to and owed by the particular financial institution for all transactions occurring during the transaction period, generate the electronic payment instruction by generating an electronic funds transfer instruction to transfer funds from a central financial institution to all financial institutions for which the calculated net position shows an amount owed thereto, and generate and output an electronic funds transfer demand instruction to transfer funds, to the central financial institution, from all financial institutions for which the calculated net position shows an amount owed thereto.

5. The automated transaction system of claim 1, wherein:

the particular parties include the sponsoring financial institution for the particular seller, a sponsoring financial institution for a particular buyer, and the particular buyer, wherein the sponsoring financial institution for the seller and the sponsoring financial institution for the buyer are among the plurality of financial institutions, the particular buyer being among the plurality of buyers, the one or more processors are configured to:

load and execute a fee engine using fee-based variables defined for at least one of the sponsoring financial institution for the particular seller or the sponsoring financial institution for the particular buyer as inputs to determine amounts of fees:

to charge to the particular seller, to charge to the particular buyer as a function of an identity of the particular buyer and an identity of the sponsoring financial institution for the particular buyer, the sponsoring financial institution for the particular seller owes the sponsoring financial institution for the particular buyer, the sponsoring financial institution for the particular buyer owes the sponsoring financial institution for the particular seller, and the sponsoring financial institution for particular buyer and the sponsoring financial institution for the particular seller owe an operating institution for operating the automated transaction system, and generate and output the electronic payment instruction by generating electronic payment data to cover the determined amounts of the fees.

6. The automated transaction system of claim 1, wherein:

the particular parties include a particular buyer from among the plurality of buyers, the plurality of financial institutions include a financial institution sponsoring the particular buyer, and the one or more processors are further configured to generate and output the electronic payment instruction by identifying, based on an applicable set of business rules from among the plurality of sets of business rules, a financial institution to use for remittance collection from the particular buyer to provide funds to cover an electronic payment generated for the related contract-defined transaction, the applicable set of business rules being for the particular buyer or the financial institution sponsoring the particular buyer.

7. The automated transaction system of claim 1, wherein:

the particular parties include a particular buyer, the plurality of financial institutions include a financial institution sponsoring the particular seller, and the one or more processors are further configured to assess a fee for processing the related contract-defined transaction.

8. The automated transaction system of claim 1, wherein the one or more processors are further configured to:

identify an external financial institution based upon at least one of: amount of the related contract-defined transaction, a location of the particular seller, and an interest rate available from the external financial institution, and process the related contract-defined transaction using the identified external financial institution.

9. The automated transaction system of claim 1, wherein the payment term includes a credit term.

* * * * *